United States Patent [19]

Mortelmans

[11] 4,149,765
[45] Apr. 17, 1979

[54] ELECTRICAL APPLIANCE CORD STORAGE

[76] Inventor: Paul Mortelmans, 222 E. Riverside Dr., #303, Austin, Tex. 78704

[21] Appl. No.: 833,308

[22] Filed: Sep. 14, 1977

Related U.S. Application Data

[62] Division of Ser. No. 693,719, Jun. 7, 1976, abandoned.

[51] Int. Cl.² .................. H01H 9/06; H01R 13/60
[52] U.S. Cl. ........................ 339/58; 15/DIG. 10; 200/157; 339/119 C
[58] Field of Search ......... 200/157; 339/2 RL, 5 RL, 339/6 RL, 8 RL, 58, 119 C, 108 R, 147 R, 147 C, 147 P; 15/DIG. 10

[56] References Cited

U.S. PATENT DOCUMENTS

| 2,591,214 | 4/1952 | Tamarin | 339/5 RL X |
| 2,639,456 | 5/1953 | Smith | 200/157 X |

Primary Examiner—Roy Lake
Assistant Examiner—E. F. Desmond

Attorney, Agent, or Firm—G. Ronald Bell; Brian M. Long

[57] ABSTRACT

The general object of this invention relates to the use of the inner space of the handle of a vacuum cleaner for storing the electrical cord, switch and plug of said appliance.

Another object of this method consists in the use of a coiled electrical appliance cord, which can easily be stored inside the handle of a vacuum cleaner.

Another object of this method is a specially designed electrical plug, which is used as a closure cap on top of the upper end of the handle of a vacuum cleaner, after that the coiled electrical cord has been stored inside said handle.

Still another object of this method is a specially designed electrical switch, which is used as a closure cap on top of the upper end of the handle of a vacuum cleaner, while the appliance is being used and after that the electrical plug has been removed from the top of the handle and said coiled electrical cord has been pulled out of said handle.

10 Claims, 3 Drawing Figures

4,149,765

ELECTRICAL APPLIANCE CORD STORAGE

This is a division of application Ser. No. 693,719, filed June 7, 1976, now abandoned.

SUMMARY OF THE INVENTION

The present invention relates to an arrangement for storing an electrical cord, switch and plug inside the handle of a vacuum cleaner and is an improvement over conventional cord storage arrangement.

The present invention employs a resiliently self-coiling electrical cord, which actually facilitates the handling and operation of the appliance.

More particularly, according to the present invention a cord storage arrangement for an electrical appliance comprises a resiliently self-coiling insulated electrical conductor cord and a tubular electrical appliance handle defining therein an elongate hollow cord storage space dimensioned to receive the cord within the handle with the cord in a coiled inoperative stored condition within the storage space. A plug is electrically connected to one end of the cord for connecting the cord to an electrical current supply on stretching of the cord into an operative condition in which the cord extends from the handle. The cord is provided with a switch and a plug which can be screwed in threaded engagement with the upper end of the handle, through which the cord extends in its operative condition.

Only a small part of this coiled electrical cord will be laying on the floor while using the vacuum cleaner, minimizing thus this inconvenience. Also the fact that the coiled electrical cord comes out of the upper end of the handle of the vacuum cleaner makes it much easier to control it while operating the appliance.

The interior space of the handle of a vacuum cleaner is really the ideal place for storing the electrical cord, switch and plug, and pulling out or pushing in the coiled electrical cord can be done very easily and fast.

Also screwing and unscrewing the electrical switch and plug on the top end of the handle is a very simple operation.

The attractiveness of this method is highlighted by the fact that nothing of the stored components is visible except the closing cap on the top end of the handle which is in fact a part of the specially designed electrical plug.

The present invention does not require a major change in the construction of the vacuum cleaner and the new components are simple in design, easy to manufacture and can readily be adapted and incorporated in existing upright vacuum cleaner models.

DESCRIPTION OF THE PREFERRED EMBODIMENTS

Figures 1, 2:
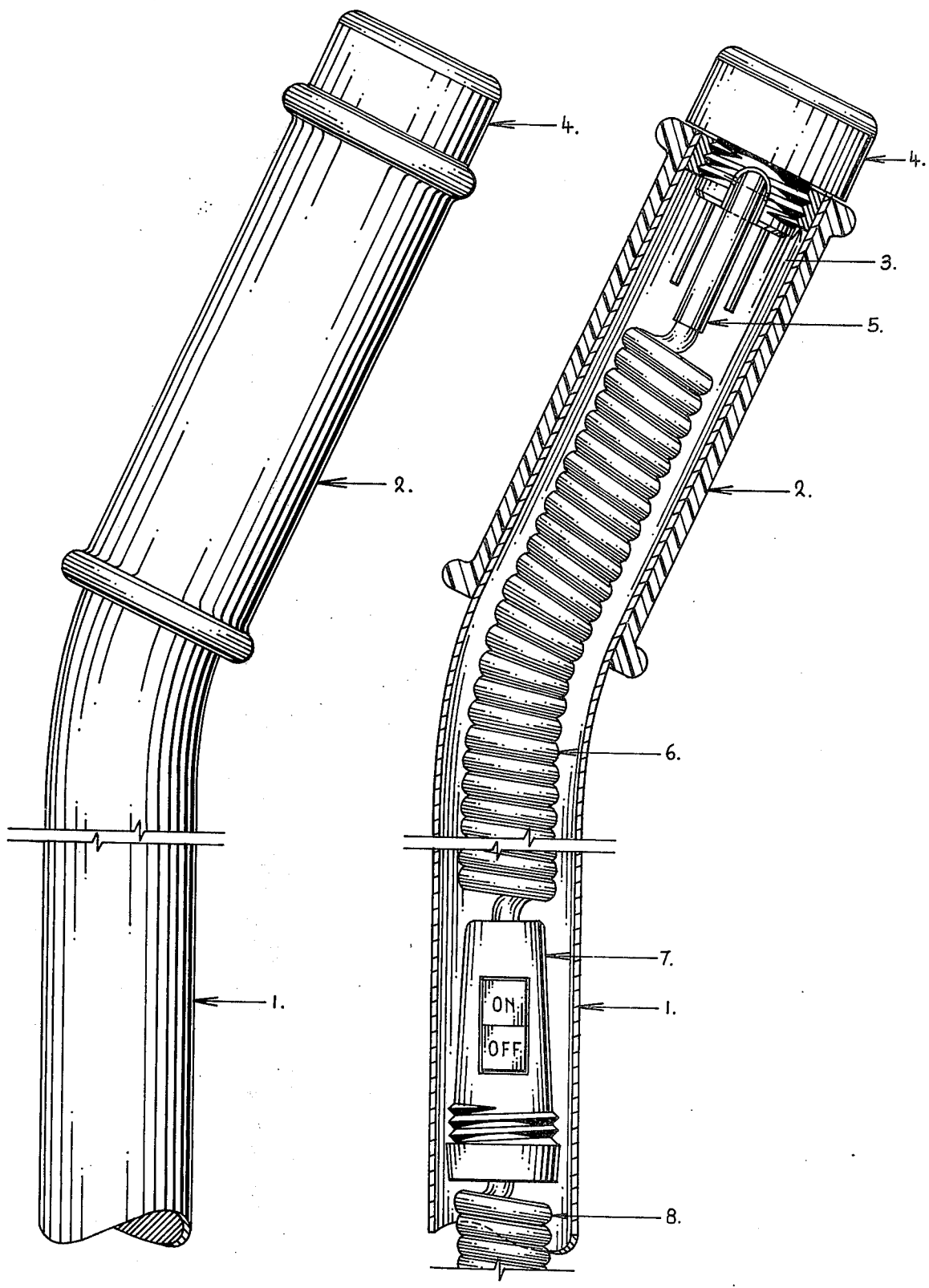
FIG. 1 is a view of the upper end and part of the lower section of the handle of a stored vacuum cleaner for storing the electrical cord, switch and plug.
FIG. 2 is a cutaway view of the upper end and part of the lower section of the handle of a vacuum cleaner, while the appliance is not in use.

Reference is made to FIG. 1 wherein the handle 1 of a vacuum cleaner is shown, after an electrical cord 6, 8, a switch and a plug 4 have been stored inside handle 1. Nothing of said stored components is visible except the top of the electrical plug 4 which serves as a closing cap for an elongate hollow cord storage space comprising the interior of the handle 1. A plastic grip 2 and the top of said electrical plug 4 can be made out of the same material, having the same finish and the same color, so that both together are part of the same grip design. The simplicity and attractiveness of this new cord storage arrangement is in sharp contrast with the conventional cord storage arrangements.

In FIG. 2 the front half of the tubular handle 1 and grip 2 have been cutaway in order to be able to show the coiled electrical cord 6 and 8, and the electrical switch 7 which is specially designed, stored inside the tubular space in handle 1; the specially designed electrical plug 4 is shown screwed on top of handle 1 and serves as a closing cap of the storing space. A threaded ring 3 is installed and secured to the top end of handle 1, so that said specially designed plug 4 can be screwed on top of handle 1, after the coiled electrical cord 6, 8 and switch 7 have been pushed inside said handle 1. The use of a coiled electrical cord 6, 8, which is of the resiliently self-coiling type, is dictated by the shape of the narrow tubular cord storage space inside handle 1. A 14 foot coiled electrical cord can easily be stored inside the handle of a regular upright type vacuum cleaner. It is of course possible to store a longer coiled electrical cord by using a cord with a smaller diameter or / and a vacuum cleaner handle with a larger diameter.

At the upper end of said coiled electrical cord 6, there is a rigid segment 5, approximatively 1" long which connects cord 6 to plug 4 and which can pivot inside said plug 4. When plug 4 is used as a closing cap and screwed on top of handle 1, said rigid segment 5 will be in a position parallel with the prongs of plug 4. The coiled electrical cord 8, smaller than coiled electrical cord 6, is always inside handle 1 of the vacuum cleaner and connects the electrical switch 7 to the electrical motor of the appliance.

Figure 3:
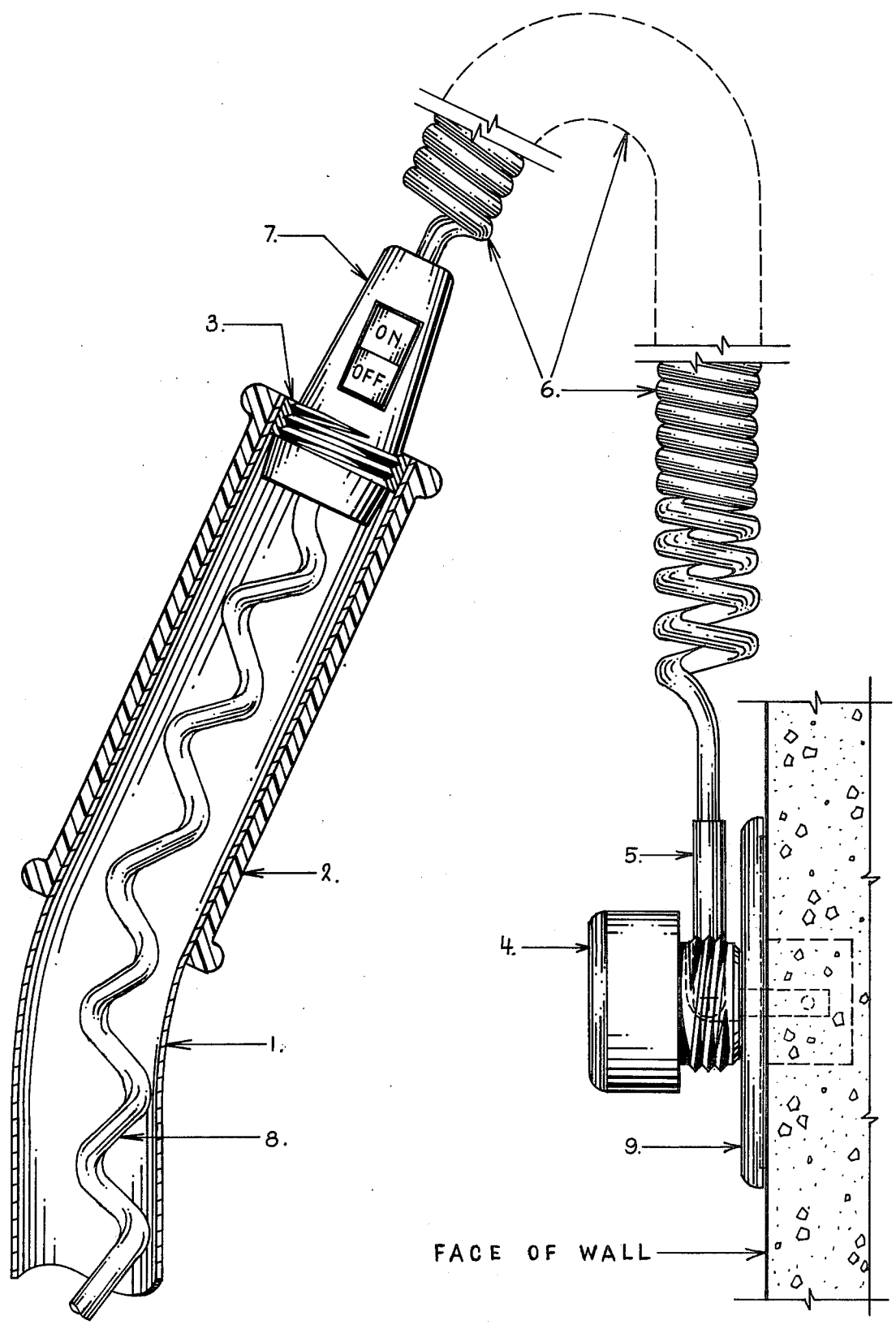
FIG. 3 is a cutaway view of the upper end of the handle of a vacuum cleaner while the appliance is in use.

Referring to FIG. 3 there is shown in section the upper end of handle 1 of a vacuum cleaner, the treaded ring 3, secured to the top end of handle 1 and the plastic grip 2, covering both the end of handle 1 and the threaded ring 3. The other components shown in this view are the coiled electrical cord 6 which has been completely pulled out of the storing space inside said handle 1; the coiled electrical cord 8 connecting the electrical switch 7 to the motor of the appliance and which is completely extended inside the tubular storing space; the threaded electrical switch 7 which is screwed in the threaded ring 3 at the top end of handle 1 and closes the storing space; electrical plug 4 which has been plugged in electrical outlet 9 and the rigid pivoting segment 5 which is now in a perpendicular position to the prongs of plug 4.

Although the descriptions and specific details above given are associated with a vacuum cleaner, it is to be understood that this new electrical cord storage arrangement can also be used in floor polishers and other applicances and tools. It is also to be understood that the descriptions and specific details above given, are not a limitation of this method, but may be modified within the scope of the appended claims.

The embodiments of the invention in which an exclusive property or privilege is claimed are defined as follows:

1. A cord storage arrangement for an electrical appliance, comprising:
- a resiliently self-coiling insulated electrical conductor cord;
- a tubular electrical appliance handle defining therein an elongate hollow cord storage space dimensioned to receive said conductor cord within said tubular handle with said conductor cord in a coiled inoperative stored condition within the storage space; and
- plug means electrically connected to one end of said cord for connecting said cord to an electrical current supply on stretching of said cord into an operative condition in which said cord extends from said handle.

2. A cord storage arrangement as claimed in claim 1, further comprising a switch connected to the other end of said cord, said switch being movable along the interior of said hollow handle with said other end of said cord.

3. A cord storage arrangement as claimed in claim 1, further comprising means for releasably retaining said plug means in one end of said handle, whereby said plug means forms a closure for said handle end.

4. A cord storage arrangement as claimed in claim 3, further comprising a switch connected to the other end of said cord, said switch being movable along the interior of said hollow handle with said other end of said cord, and means for releasably retaining said switch in said end of said handle.

5. A cord storage arrangement claimed in claim 3, wherein said plug means comprises a plug body and means pivotally connecting said plug body to said one end of said cord for pivotation of said plug means between an inoperative position, to facilitate insertion of said plug means into said one end of said handle, and an operative position in which said plug means are ready for insertion into a socket.

6. An electrical appliance, comprising:
- a resiliently self-coiling insulated electrical conductor cord;
- plug means electrically connected to one end of said cord for connecting said appliance to an electrical current supply;
- means for connecting the other end of said cord to said appliance;
- an appliance handle of tubular shape having an elongate hollow interior dimensioned to accommodate said cord in a coiled inoperative stored condition within said tubular handle; and
- means defining an opening in said handle in communication with the hollow interior of said handle for receiving said cord therethrough on stretching of said cord from its stored condition to an operative condition.

7. An electrical appliance as claimed in claim 6, wherein said plug means comprises a plug body adapted to fit into said opening and form a closure therefor, means being provided for releasably securing said plug body in said opening, and means pivotally connecting said cord to said plug body to allow pivotation of said plug body between the first position in which conductor pins extend from said plug body parallel to an adjacent end portion of said cord and a second position in which said pins extend in a direction perpendicular to said end portion.

8. An electrical appliance as claimed in claim 6, wherein said connecting means comprise a switch electrically connected to the other end of said cord, said switch being movable along the interior of said handle to and from said opening, and means being provided for releasably securing said switch in an operative position in which said switch is located in said opening and projects therefrom to the exterior of said handle.

9. An electrical appliance as claimed in claim 8, wherein said releasable securing means comprise a first screw thread provided on said handle at said opening for threaded engagement with a second screw thread provided on said switch.

10. An electrical appliance as claimed in claim 7, wherein said releasable securing means comprise a first screw thread provided on said handle at said opening for threaded engagement with a second screw thread provided on said plug body.

* * * * *